United States Patent
Vasic

(10) Patent No.: US 9,864,892 B2
(45) Date of Patent: Jan. 9, 2018

(54) INCREASING INFORMATION SIZE IN TWO-DIMENSIONAL BARCODES

(71) Applicant: SICPA HOLDING SA, Prilly (CH)

(72) Inventor: Milan Vasic, Geneva (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 15/034,559

(22) PCT Filed: Nov. 4, 2014

(86) PCT No.: PCT/EP2014/073670
§ 371 (c)(1),
(2) Date: May 5, 2016

(87) PCT Pub. No.: WO2015/067592
PCT Pub. Date: May 14, 2015

(65) Prior Publication Data
US 2016/0267312 A1    Sep. 15, 2016

Related U.S. Application Data

(60) Provisional application No. 61/900,617, filed on Nov. 6, 2013.

(51) Int. Cl.
*G06K 7/10* (2006.01)
*G06K 7/14* (2006.01)
*G06K 19/06* (2006.01)

(52) U.S. Cl.
CPC ......... *G06K 7/1473* (2013.01); *G06K 7/1417* (2013.01); *G06K 7/1443* (2013.01); *G06K 7/1456* (2013.01); *G06K 19/06037* (2013.01); *G06K 19/06056* (2013.01); *G06K 19/06075* (2013.01)

(58) Field of Classification Search
CPC ...... G06K 7/14; G06K 7/1404; G06K 7/1408; G06K 7/1417; G06K 7/1434; G06K 7/1439; G06K 7/1473
See application file for complete search history.

(56) References Cited

U.S. PATENT DOCUMENTS 7,597,262 B2 * 10/2009 Wang ............... G06K 19/06037
235/462.01

FOREIGN PATENT DOCUMENTS

EP    1559063    12/2010

OTHER PUBLICATIONS

International Search Report and Written Opinion issued with respect to application No. PCT/EP2014/073670.

* cited by examiner

*Primary Examiner* — Thien M Le
*Assistant Examiner* — April Taylor
(74) *Attorney, Agent, or Firm* — Greenblum & Bernstein, P.L.C.

(57) ABSTRACT

Decoding or encoding information in a two-dimensional barcode, the barcode comprising an orientation pattern and a payload data pattern both being compiled of first and second type elements. The decoding or encoding involves a two-dimensional transformation applying at least to the payload data pattern in connection with second information that forms together with first information the information encoded in the two-dimensional barcode.

30 Claims, 5 Drawing Sheets

Fig. 5A
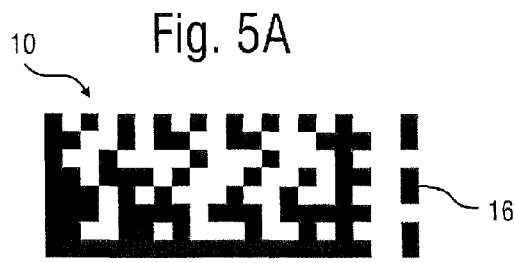
Fig. 5C
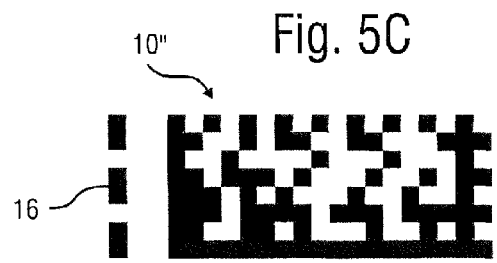
Fig. 5B
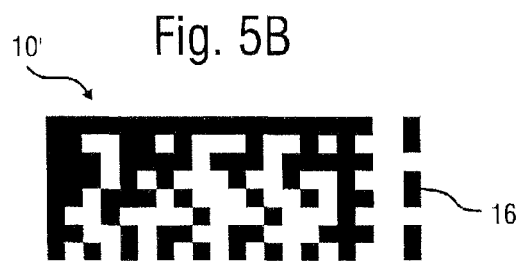
Fig. 5D
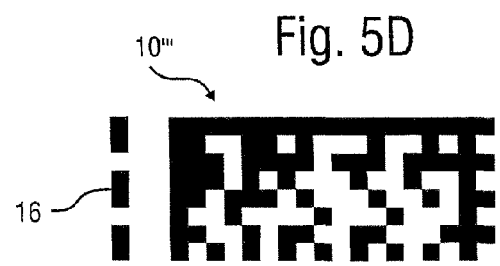
Fig. 6A
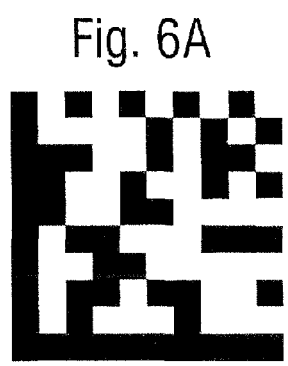
Fig. 6B
Fig. 6C
Fig. 6D
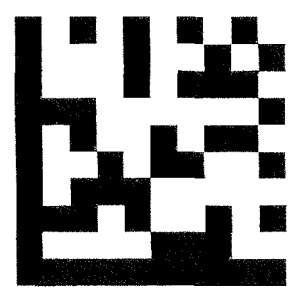

Fig. 7A
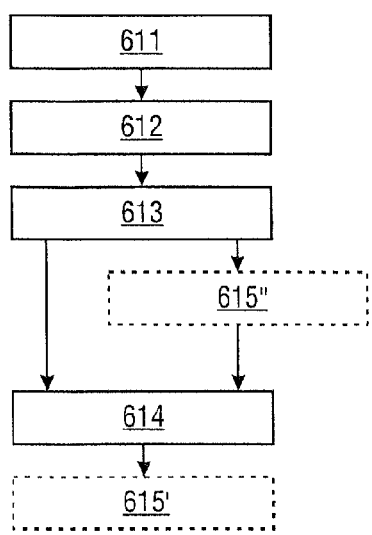
Fig. 7B
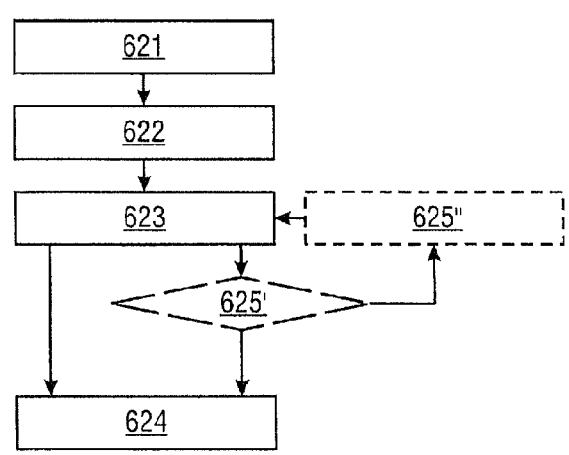
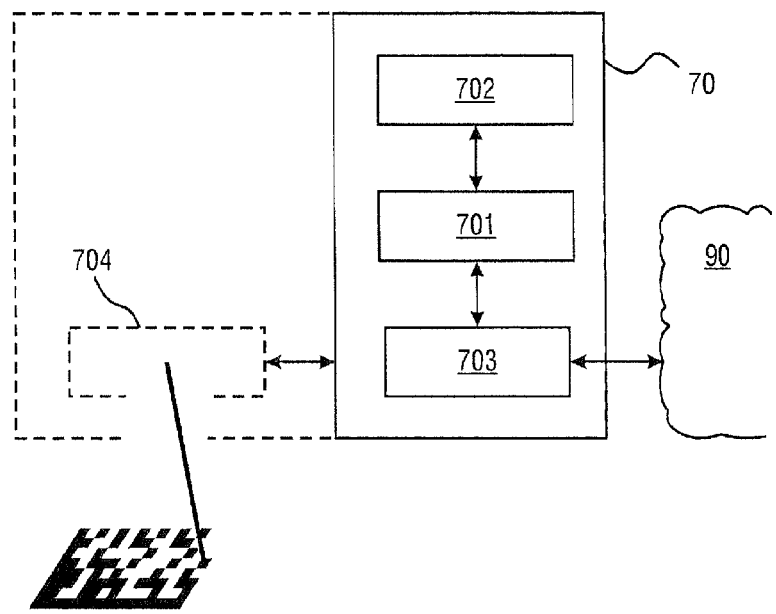
Fig. 8

INCREASING INFORMATION SIZE IN TWO-DIMENSIONAL BARCODES

TECHNICAL FIELD

The present invention relates to encoding and decoding information in a two-dimensional barcode. Specifically, the present invention relates to a method of encoding information in a two-dimensional barcode, a method of decoding information in a two-dimensional barcode, and also relates to corresponding devices configured to encode information in a two-dimensional barcode and configured to decode information in a two-dimensional barcode. More specifically, the present invention also relates to devices that compile a two-dimensional barcode pattern to be attached to an item and devices that read and decode a two-dimensional barcode attached on an item.

BACKGROUND

Nowadays, two-dimensional barcodes are ubiquitously found on a large number of items, including consumer products, spare parts, devices, fashion and/or luxury goods, perfumes, alcoholic and non-alcoholic beverages, tobacco products (cigarettes, cigars, loose tobacco and the like), etc. Furthermore, barcodes can also be found on all sorts of documents as items, including tickets, papers, currency bills, certificates, passports, ID cards, etc. Usually, these barcodes are used on the item for allowing a verification of the authenticity of the corresponding item. Specifically, by reading and decoding the two-dimensional barcode one can obtain information on whether (or to what degree of certainty) the corresponding item is authentic, genuine or complies with legal regulations, such as proper payment of tax and/or applicable fees.

FIG. 1A shows a schematic view of a two-dimensional barcode 10 according to the GS1 (trademark) data matrix ECC200 standard (GS1 being an International association providing standards for two-dimensional barcodes). This standard considers the two-dimensional barcode being formed by two types of elements, namely a first type element 11 and a second type element 12. Elements 11, 12 can be in form of dots or squares and can be formed on an item (document, product, package, etc.) by any suitable means. Specifically, the first type elements 11 can be printed onto an item surface whereby the non-printed areas then remain to form the second type elements 12. In general, printing a two-dimensional barcode in the context of the present disclosure is meant to include any suitable means, such as inter printing, laser printing, etching, embossing, etc. Any of these suitable ways to print the two-dimensional barcode on an item can be considered as long as the first and second type elements 11, 12 are formed on the item in a sufficiently stable fashion and remain distinguishable for a sufficient period of time.

The data matrix two-dimensional barcode 10 is compiled of an orientation pattern 14, 15 and a payload data pattern 13. The former orientation pattern is, in turn, compiled of a so-called L-shaped clock line 14 and an L-shaped solid line 15. Whereas the solid line 15 is compiled of elements of one type only, e.g. of first type elements 11, the clock line 14 is compiled of elements of alternating type. It may be further provided that the corner element of the clock line 14 is of a specific type, e.g. as shown of the first type. The orientation pattern of barcode 10 may also be referred to as the so-called finder pattern which facilitates reliable detection and decoding of the barcode by image processing. Specifically, the clock line 14 provides some information on the dimensions of the barcode and helps defining the columns and rows of the ordered grid along which the payload data pattern 13 is defined. The two-dimensional barcode 10 of FIG. 1A is of a so-called asymmetric type, since the numbers of rows and columns differ so as to assume generally a rectangle-like shape.

FIG. 1B shows a further example of a data matrix two-dimensional barcode in the form of a symmetric, i.e. square-like, barcode 19. Although both the orientation pattern and the payload data pattern are the same as in the one of FIG. 1A, barcode 19 has the same number of rows as the number of columns. Therefore, two-dimensional barcode 19 assumes the shape of a square.

FIG. 1C shows another type of two-dimensional barcode in the form of a so-called QR-code 20. Likewise, two-dimensional barcode 20 is compiled of first and second type elements 11, 12 which are described in conjunction with FIG. 1A. Also, two-dimensional barcode 20 is compiled of an orientation pattern 24 and a payload data pattern 23. It is to be noted that the payload data 23 does not need to completely fill the area as defined by the orientation pattern 24. Specifically, payload data pattern 23 may only make use of a part of that area and other parts may be used for printing clear text messages and/or graphical elements. In the case of the QR-code 20, the orientation pattern 24 is compiled of three marks which are, in turn, compiled of a black square, e.g. composed of 3×3 first time elements 11, surrounded by a square of second type elements 12, another square composed of first time elements 11 and—at least toward the internal sides of the barcode 20—sections of second type elements 12.

The decoding of a barcode usually begins with taking a (digital) image of the barcode attached on a given item. Such an image is then obtained as digital image data defining respective pixel values for the pixels of the image. This digital image data is then subject to image processing by means of a processing unit (e.g. CPU, Computer, Server, Embedded System, ASIC, etc.). Such processing may be divided into various individual steps for eventually decoding the data that is encoded in the two-dimensional barcode.

Since two-dimensional barcodes are usually formed as some kind of binary pattern (in the sense of being composed of elements of two different, distinguishable types), the amount of information that can be kept (encoded) in the two-dimensional barcode depends on the number of columns and rows of the two-dimensional barcode, i.e. the so-called barcode dimensions. In other words, the more columns or the more rows there are, the more distinguishable elements can be arranged in the pattern, and, with this, more bits of information can be encoded.

At the same time, however, the overall size of the two-dimensional barcode is usually subject to restrictions regarding the item's size and shape, the design and surface features of the item, etc. Specifically, it is usually not possible to cover an arbitrary part of an item with a two-dimensional barcode. On the contrary, manufacturers or distributors may substantially limit the area on an item where a two-dimensional barcode can be attached and the will usually want the area covered by a barcode to be as small as possible. In addition to this, also the size of the individual elements is subject to restrictions, since they need to remain distinguishable and durable according to the corresponding specifications, and, therefore, will need to be of some kind of minimal size. As a consequence, these limitations may result in the acceptable two-dimensional barcodes to carry only a limited amount of information. That is, the number of different and distinguishable pattern combinations is limited for a given barcode dimension and/or size.

Considering consumer goods, such as beverage cans/bottles, cigarette packages, and the like, it is clear that the two-dimensional barcode is usually printed on a large number of individual items. At the same time, the purpose of the two-dimensional barcode of providing some means of determining authenticity of the item may require the ability to encode a large number of different information sets in the attached barcodes. For example, some kind of identifier (ID), possibly also comprising some kind of signature, encrypted code or the like, is encoded in the two-dimensional barcode for later allowing authentication of the individual items, including also the detection of counterfeits and copies. Especially the latter can be determined for example by detecting in the field two identical IDs on different items which, for the case that each individual item has a unique ID, may readily uncover forgery.

There is therefore a need to increase the number of different and distinguishable patterns that can be encoded as a two-dimensional barcode, while at the same time maintaining the size of the individual elements and the size (dimension) of the two-dimensional barcode as such. More specifically, there is a need to allow the identification of a larger number of individual items by means of attaching two-dimensional barcodes while the size of the two-dimensional barcode as such can be maintained in order to keep the interference with the design and surface properties of the items as low as possible, and which maintains the size and appearance of the individual elements so as to maintain the robustness, reliability, and quality of the barcode in the field, especially during later reading and/or decoding.

SUMMARY

The above-mentioned objects and problems are solved by the subject matter of the independent claims. Further preferred embodiments are defined in the dependent claims.

According to one aspect of the present invention, there is provided a method of encoding information in a two-dimensional barcode, the barcode comprising an orientation pattern and a payload data pattern both being compiled of first and second type elements, the method comprising the steps of obtaining information to be encoded in the two-dimensional barcode; extracting, from the obtained information, first and second information, wherein the first information is to be encoded in the payload data pattern of the two-dimensional barcode; generating the payload data pattern based on the first information; compiling a two-dimensional barcode pattern from the generated payload data pattern and an orientation pattern, wherein a two-dimensional transformation is considered based on the second information, the two-dimensional transformation applying at least to the payload data pattern.

According to another aspect of the present invention, there is provided a method of decoding information in a two-dimensional barcode, the barcode comprising an orientation pattern and a payload data pattern both being compiled of first and second type elements, the method comprising the steps of identifying the type of the elements and the positions of the elements from image data of the two-dimensional barcode; assuming a two-dimensional transformation having applied to at least the payload data pattern and setting accordingly second information; decoding first information from the identified positions and types of the elements of the payload data pattern based on the assumed two-dimensional transformation; and compiling the information in the two-dimensional barcode from the first information and the second information.

According to another aspect of the present invention, there is provided a device for encoding information in a two-dimensional barcode, the barcode comprising an orientation pattern and a payload data pattern both being compiled of first and second type elements, the device comprising processing resources being configured to obtain information to be encoded in the two-dimensional barcode; extract, from the obtained information, first and second information, wherein the first information is to be encoded in the payload data pattern of the two-dimensional barcode; generate the payload data pattern based on the first information; compile a two-dimensional barcode pattern from the generated payload data pattern and an orientation pattern, wherein a two-dimensional transformation is considered based on the second information, the two-dimensional transformation applying at least to the payload data pattern.

According to another aspect of the present invention, there is provided a device for decoding information in a two-dimensional barcode, the barcode comprising an orientation pattern and a payload data pattern both being compiled of first and second type elements, the device comprising processing resources being configured to identify the type of the elements and the positions of the elements from image data of the two-dimensional barcode; assume a two-dimensional transformation having applied to at least the payload data pattern and setting accordingly second information; decode first information from the identified positions and types of the elements of the payload data pattern based on the assumed two-dimensional transformation; and to compile the information in the two-dimensional barcode from the first information and the second information.

According to further aspects of the present invention, there are provided corresponding computer programs and computer program products.

BRIEF DESCRIPTION OF THE DRAWINGS

Embodiments of the present invention, which are presented for better understanding the inventive concepts and which are not the same as limiting the invention, will now be described with reference to the figures in which:

FIGS. 5A to 5D show schematic views of asymmetric two-dimensional barcodes subject to a transformation according to an embodiment of the present invention;

FIGS. 6A to 6D show schematic views of symmetric two-dimensional barcodes subject to a transformation according to an embodiment of the present invention;

FIGS. 7A and 7B show schematic flow charts of method embodiments of the present invention;

FIG. 8 shows a schematic view of a device for encoding (and optionally printing) a two-dimensional barcodes according to a device embodiment of the present invention.

DETAILED DESCRIPTION

Figure 1A:
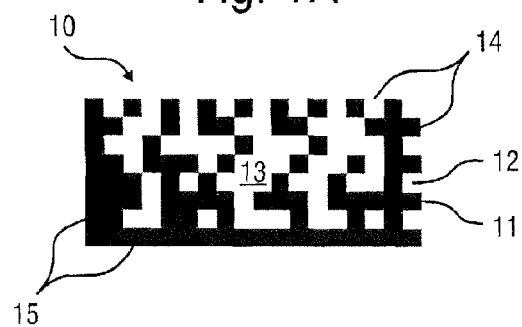
FIG. 1A to 1C show schematic views of two-dimensional barcodes following conventional standards and examples.
Figure 2A:
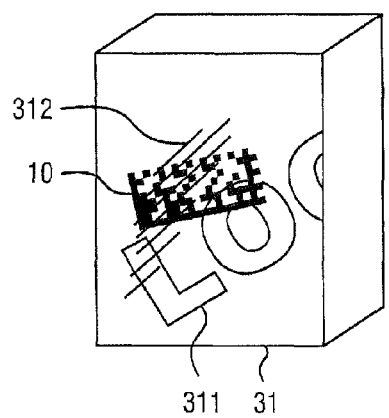
FIGS. 2A and 2B show schematic views of items with attached two-dimensional barcodes according to an embodiment of the present invention.
Figure 2B:
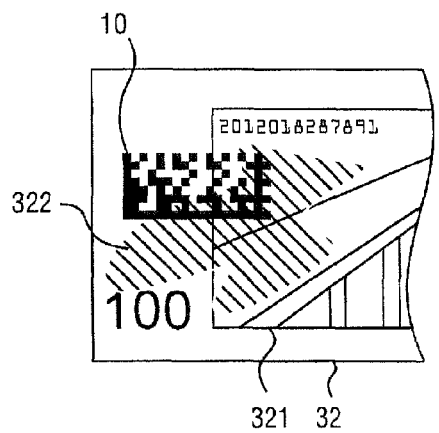

FIGS. 2A and 2B show schematic views of items with attached two-dimensional barcodes according to an embodiment of the present invention. Specifically, FIG. 1A shows a schematic view of a two-dimensional barcode 10 attached to an exemplary item 31 shown in the form of a package. This package may for example contain a tradable good, such as a consumer product, an electronic device, food, alcoholic or non-alcoholic beverages, tobacco products (cigarettes, cigars, loose tobacco, etc.), and the like. The barcode 10 is attached to item 31 by any suitable means including printing the barcode 10 directly onto a package or applying an adhesive sticker with the barcode 10 to the package.

It may be also conceivable to attach the barcode to the product as such, wherein—as long as the implementation permits—the barcode can be directly attached to for example a housing of an electronic device. Such examples also include beverage packages such as cans and bottles. In this sense, the product itself can be a part of the package as, for example, a bottle cap. Such metallic parts may be particularly suitable for attaching (printing) the barcode by etching, laser-writing or embossing means.

Usually, item 31 (package, product, etc.) has some design features 311 on its surface. Common examples are multi-color and graphically designed logos, brand names, product descriptions, hazard warnings, and the like that are printed or applied in any other suitable fashion to a package/product surface. Thus, barcode 10 can generally overlap with such features 311 and there should be as few as possible restrictions regarding the design, appearance, and optical characteristics of features 311 and also regarding the positioning of barcode 10 relative to features 311. Furthermore, some kind of cover 312 may be arranged on top of the package surface and—with this—also barcode 10. Examples for cover 112 include protective coatings, such as transparent plastic films, transparent lacquer films, and the like. Moreover, package 31 may also be subject to contamination and dirt, so that cover 312 may be in the form of an irregular and uncontrollable accumulation of dust/dirt particles or dried liquids.

FIG. 2B shows a schematic view of a barcode 10 attached to a currency bill 32 that generally represents a document or certificate. Currency bill 32 naturally comprises design features 321 usually depicting the bill denomination, serial numbers, pictures, etc. Of course, currency bill 32—as generally any document/certificate—can be subject to contamination 322 which may influence the barcode 10 on bill 32.

Figure 1C:
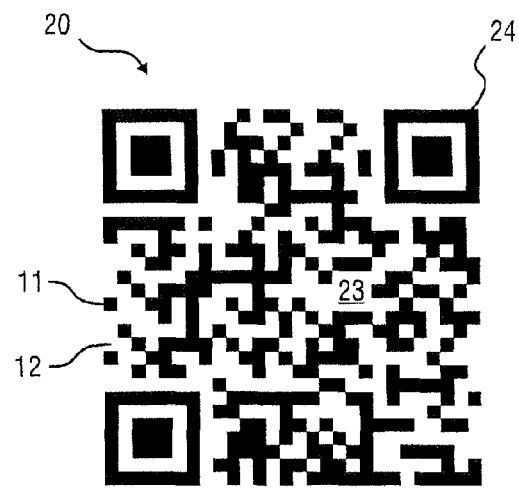
Figure 1B:
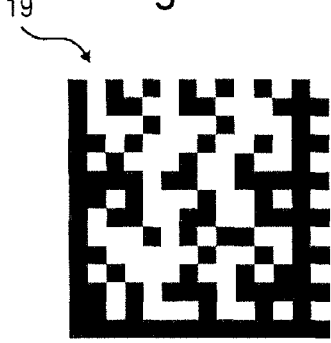

According to the present embodiment, the two-dimensional barcodes 10 as shown attached to items in FIGS. 2A and 2B are subject to a transformation in line with information (second information) that is to be encoded with the barcode in addition to the information (first information) that is to be encoded in the payload data pattern itself. As already described in conjunction with FIGS. 1A to 1C, there are generally two classes of two-dimensional barcodes, namely the asymmetric ones such as barcode 10 of FIG. 1A and the symmetric ones as barcodes 19, 20 of FIGS. 1B and 1C.

In the case of symmetric (square-like) barcodes, the consideration of the orientation pattern alone may not be sufficient to reliably distinguish between a rotation transformation and a reflection transformation (mirroring), which is, however, different for the asymmetric, rectangle-type barcodes. For the latter, it may be sufficient to consider only the orientation pattern (e.g. one of the clock line 14 and the solid line 15) in order to be able to distinguish between a rotation transformation and a reflection transformation. Since, a rotation transformation may also occur unintentionally (e.g. the item is rotated during inspection), additional considerations may apply that are described in conjunction with the further embodiments of the present invention.

Figure 3A:
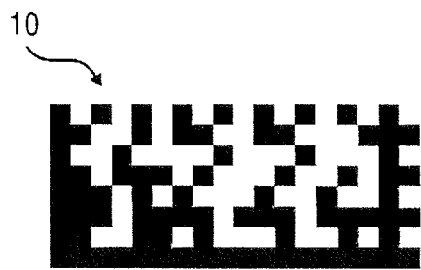
FIGS. 3A to 3C show schematic views of asymmetric two-dimensional barcodes subject to a transformation according to an embodiment of the present invention.
Figure 3B:
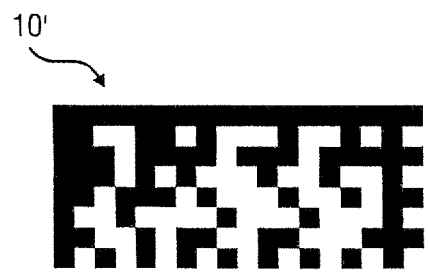
Figure 3C:
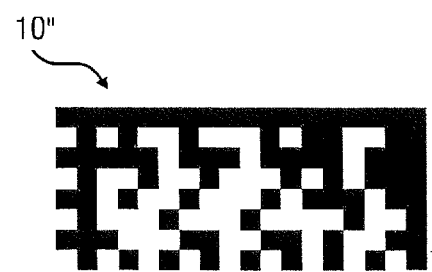

FIGS. 3A to 3C show a schematic view of an asymmetric datamatrix two-dimensional barcode 10 (FIG. 3A) which is to represent an original barcode, so to speak subject to an identity transformation. The originator barcode 10 can be subject to a reflection transformation (mirroring) resulting in the mirrored two-dimensional barcode 10' of FIG. 3B, or subject to a rotation transformation which results in the rotated two-dimensional barcode 10' of FIG. 3C. As apparent from a comparison of FIGS. 3A with 3B and 3A with 3C, for the case of an asymmetric two-dimensional barcode a rotation transformation can be distinguished from a reflection transformation by only looking at the orientation pattern.

In the field, however, a two-dimensional barcode attached to an item may be naturally subject to rotation transformation since the items may arrive in an irregular fashion at the printing stage, i.e. the stage where the two-dimensional barcode is attached to the item surface, or the items may have an arbitrary orientation with respect to a reading device at the time of reading/inspection. Therefore, decoding barcodes 10 and 1" of FIGS. 3A and 3C respectively will result in the same decoding since considering a rotation is usually part of the decoding process.

However, barcode 10' as shown in FIG. 3B can be determined to be a mirrored barcode being subject to a reflection transformation and thus it can be decoded accordingly. Specifically, it may be determined that barcode 10' has gone through a reflection transformation and therefore is decoded as its mirror image (back reflection transformation). After decoding the back transformed barcode the decoded information may be the same as resulting from decoding barcode 10 of FIG. 3A. However, the prior determination of barcode 10' being subject to a reflection transformation may then be considered when outputting the overall decoding result by modifying the result from the decoding as such accordingly. For example, the decoding result may be expended by an additional bit that either indicates that the input barcode was or was not subject to a reflection transformation. In this way, the bit length of the information word that can be encoded in the two-dimensional barcode is expanded by one, doubling the number of representable figures, albeit the size and dimension of the two-dimensional barcode remains unchanged.

Figure 4A:
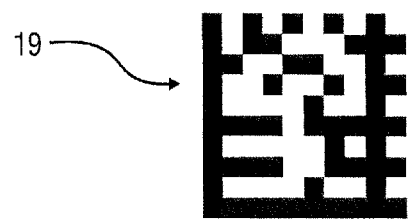
FIGS. 4A to 4C show schematic views of symmetric two-dimensional barcodes subject to a transformation according to an embodiment of the present invention.
Figure 4B:
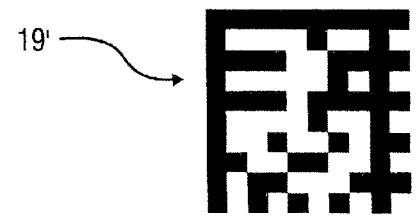
Figure 4C:
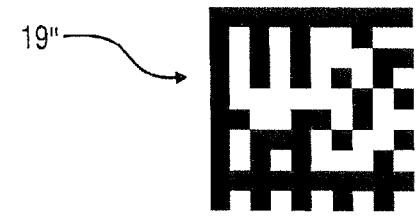

FIGS. 4A to 4C show a symmetric datamatrix two-dimensional barcode 19 shown as an originator (identity transformation) in FIG. 4A. The barcode 19 can then be subject to a reflection transformation resulting in two-dimensional barcode 19' shown in FIG. 4B, or is subject to a rotation transformation that results in two-dimensional barcode 19" as shown in FIG. 4C. As apparent, a reflection transformation cannot be distinguished from a rotation transformation from the orientation pattern alone in the case of a symmetric two-dimensional barcode.

However, in such a case the payload data pattern of the two-dimensional barcode can be used for distinguishing a rotation transformation from a reflection transformation. Such embodiments may consider error detection and/or checksum mechanisms (verification mechanism) that may be present as part of the information encoding and payload data pattern generation process. If one looks at two-dimensional barcodes 19' and 19'" of FIGS. 4B and 4C, respectively, it is apparent that the orientation and configuration of the respective orientation patterns of barcodes 19' and 19'" are the same. Since two-dimensional barcode 19' is assumed to be a mere rotation from barcode 19 as shown in FIG. 4A, decoding barcode 19' will result in a successful decoding taking into account the error detection and checksum mechanisms (verification mechanism) present in the encoded payload data pattern.

On the contrary, the decoding of two-dimensional barcode 19" of FIG. 4C (as a merely rotated barcode) will probably fail, since the payload data pattern was subject to a reflection transformation as opposed to a mere rotation transformation in barcode 19'. If it is determined that the decoding for an input two-dimensional barcode fails it may thus be considered to apply an inverse reflection transformation so as to mirror back two-dimensional barcode 19'" to the pattern of two-dimensional barcode 19 of FIG. 4A. However, this back transformation is again considered when compiling the output decoding result that is to be compiled from a decoding result of the pattern as shown with the two-dimensional barcode 19 of FIG. 4A. Again, an additional bit may be set accordingly.

Although the consideration of a reflection transformation for the purpose of encoding additional information into a square like symmetric two-dimensional barcode may rely on error detection mechanism and or checksums (verification mechanism) being present in the payload data pattern, the information width is still increased. Specifically, it is achieved an expansion of the data width while maintaining at the same time error detection. In other words, the mechanisms being employed for error detection are exploited for the use of distinguishing a mere rotation transformation from a reflection transformation for the purpose of encoding an additional unit of information.

As an example, a two-dimensional barcode with an 8×8 payload data pattern (e.g. the ones as shown in FIGS. 4A to 4C) has 64 positions in the payload data pattern which can be occupied by either a first type element 11 or a second type element 12. Therefore, 64 bits are available. In case some bits are used for checksum/error detection or verification purposes, these bits will naturally reduce the number of bits that are available for carrying payload data. However, these bits will be sacrificed anyway, if the applied standard prescribes such mechanisms. For example, 4 bits may be occupied by these mechanisms so that 60 bits remain. According to the present embodiment, one bit can be gained (second information) and in all 61 bits are available for carrying data. As a result the number of distinguishable patterns is doubled from $2^{60}$ to $2^{61}$. However, there are also other verification mechanisms that do not reduce the number of bits but take into account a specific arrangement of the individual bits (elements in the payload area), such as assigning the bits and bytes to coefficients of a Reed-Solomon polynomial as, for example, described in conjunction with FIGS. 6A to 6D.

In the case of an asymmetric barcode (e.g. the ones as shown in FIGS. 3A to 3C) the full number of bits may be employed for encoding data, so that the number of distinguishable patterns for a corresponding 4×16 asymmetric payload data pattern is doubled from $2^{64}$ to $2^{65}$.

For both the cases of a symmetric and an asymmetric barcode, the decoding result or the information to be encoded may be composed of a set of bits $b_i$, wherein the index i runs from 1 to the number of available bits. According to the present embodiment, (i−1) bits are accommodated in the payload data pattern and thus represent the first information. The first or ith bit then completes the information as the second information.

FIGS. 5A to 5B show exemplary two-dimensional barcodes 10, 10', 10" and 10'" together with an additional feature 16 providing a means of orientating the accompanying barcode. The feature 16 may be as such also formed by a combination of the already mentioned and described first and second type elements 11, 12. However, the form and appearance of the additional feature 16 should not be limited to a combination of these elements and may thus generally differ in size and aspect ratio from the elements 11, 12 that are used to compile the two-dimensional barcode pattern. Usually, the same type of ink and/or printing process (including embossing, milling, etching, and the like), are employed for printing (attaching) the two-dimensional barcode 10 and the additional element 16. Further, the additional element 16 may also be formed by design or surface features of the item so that they allow for a definition of a well-defined orientation of the barcode relative to the element 16.

According to the present embodiment, a transformation of the two-dimensional barcodes can be effected relative to the additional element 16, whereby said transformation may include anyone of a rotation transformation and a reflection transformation (mirroring). If the barcode 10 as shown with FIG. 5A is assumed to be an original (identity transformation) barcode, i.e. a barcode pattern which was so far not subject to any transformation, the orientation of barcode 10 relative to the additional element 16 may define a first configuration. Following this example, the application of a reflection transformation may yield the two-dimensional barcode 10' as shown in FIG. 5B. Together with the additional element 16, the two-dimensional barcode 10', albeit originating from the same pattern as that of barcode 10, may define a second configuration. Likewise, a rotation transformation can yield the two-dimensional barcode 10" relative to the additional element 16 as shown in FIG. 5C as a third configuration, and a rotation and reflection transformation may yield the two-dimensional barcode 10'" relative to the additional element 16 as shown in FIG. 5D forming a fourth configuration.

In other words, a transformation and additional elements can be employed to encode several configurations whilst maintaining the size of the barcode as such and its constituting elements. In the example as shown in conjunction with FIGS. 5A to 5D, the information length can be expanded by two bits, i.e. the number of distinguishable patterns (codes) is multiplied by a factor of 4. Although only a specific example is shown, further embodiments of the present invention generally encompass the use of a transformation together with additional elements for expanding the dimensionality of the data that can be encoded/decoded in the two-dimensional barcode in any suitable fashion, so that any information in form of a bit sequence $b_i$ can be separated into a first bit sequence $b_{1...j}$ (or: $b_{(j+1)...i}$) accommodated in the payload data pattern and a second bit sequence $b_{(j+1)...i}$ (or $b_{1...j}$) represented by the transformation.

FIGS. 6A to 6D show schematic views of symmetric two-dimensional barcodes subject to a transformation according to an embodiment of the present invention. Specifically, FIG. 6A shows an exemplary barcode pattern of a symmetric two-dimensional barcode in line with the ECC200 datamatrix standard with an overall dimension of 10×10 elements, resulting in a payload area with dimension 8×8. FIG. 6B shows the distribution of the payload bits across the payload data pattern with 8×8 bits, i.e. eight bytes á 8 bits. The denomination follows the format B.b, where B indicates the byte and b the bit. Therefore, the top left bit "2.1" is bit 1 of byte 2. The entire sequence the runs from the most significant bit (MSB) 1.1 to the least significant bit (LSB) 8.8. An origin can be defined for decoding purposes, e.g. as position 7.7 in the lower left.

The bit arrangement (as the one shown in FIG. 6B) can also be represented by a mask, so that applying the mask onto the read pattern yield the bit sequence in the correct order. Assuming that the barcode shown in FIG. 6A is not transformed (identity transformation), the bit sequence can be obtained as (0)10001110
(0)00110100
(0)10000001
(0)10010011
(0)01100110
(0)00110011
(0)00001001
(0)00000110, whereas "(0)" represents the assumption regarding the transformation. It should be clear that (0)1000111000110100 ... 0110
and
1000111000110100 ... 0110(0)

are equally possible representations. In any way, the coefficients of a Reed-Solomon polynomial can be set accordingly so as to yield the coded data, e.g. "123".

FIG. 6D shows the barcode pattern that results from applying a transformation to the payload data pattern of the barcode as shown in FIG. 6A. Specifically, the payload data pattern was subject to a reflectional (mirroring) and a rotational transformation. If now the bit arrangement of FIG. 6B is also assumed for the pattern of FIG. 6D, then the bit sequence can be obtained as (0)00110000
(0)00000110
(0)01001010
(0)11010111
(0)10000010
(0)10010111
(0)00011000
(0)11000001.

It can now be determined that setting the coefficients of a Reed-Solomon polynomial accordingly will fail, since the values do not satisfy the Reed-Solomon polynomial. This is one embodiment for a verification mechanism that allows the detection of a transformation also for symmetric two-dimensional barcodes. Therefore, it can now be assumed that the barcode shown in FIG. 6D is transformed (reflection and/or rotation), the bit sequence can be obtained with the correspondingly transformed mask (arrangement) as shown in FIG. 6C to yield (1)10001110
(1)00110100
(1)10000001

-continued (1)10010011
(1)01100110
(1)00110011
(1)00001001
(1)00000110.

This bit pattern satisfies the Reed-Solomon polynomial and the coefficients can be set accordingly so as to yield the same coded data, e.g. "123", but with the additional information (second information) of the transformation (1). In a way, there are thus two distinguishable ways of encoding the same code word so as to effectively yield a doubling of the number of distinguishably representable data whilst maintaining barcode and element size.

FIG. 7A shows a schematic flow chart of a method embodiment of the present invention relating to encoding information in a two-dimensional barcode. Specifically, this embodiment implements a method of encoding information in a two-dimensional barcode, the barcode comprising an orientation pattern and a payload data pattern both being compiled of first and second type elements. The method comprises a step 611 of obtaining information to be encoded in the two-dimensional barcode. From the obtained information, first and second information is extracted in step 612, wherein the first information is to be encoded in the payload data pattern of the two-dimensional barcode. Based on the extracted first information the payload data pattern is generated in step 613, and in step 614 the (output) two-dimensional barcode pattern is compiled from the generated payload data pattern and a suitable orientation pattern.

Further, a two-dimensional transformation is considered (reviewed) (615) based on the second information, wherein the two-dimensional transformation applying at least to the payload data pattern. The consideration 615 may take place in the form of the following alternative embodiments. First, the two-dimensional transformation can be considered by a step 615' of applying the two-dimensional transformation to the complied two-dimensional barcode pattern based on the second information. Further, the two-dimensional transformation can be considered by a step 615" of applying the two-dimensional transformation to the payload data pattern based on the second information. Yet further, the two-dimensional transformation can be considered, based on the second information, during the step 613 of generating the payload data pattern based on the first information.

FIG. 7B shows a schematic flow chart of method embodiments of the present invention relating to decoding information in a two-dimensional barcode. Specifically, this embodiment implements a method of decoding information in a two-dimensional barcode, the barcode comprising an orientation pattern and a payload data pattern both being compiled of first and second type elements. The method comprises a step 621 of identifying the type of the elements and the positions of the elements from image data of the two-dimensional barcode. This step may involve digital image processing that analyses digital (raw) input data taken from the barcode usually attached on an item by some sort of camera. Said image processing may involve various techniques—that are as such known in the arts—including thresholding, edge detection, etc. for yielding some kind of information on elements of what type are arranged at the positions defined by the barcode pattern.

The method according to this embodiment further comprises a step 622 of assuming a two-dimensional transformation having applied to at least the payload data pattern and setting accordingly second information. First information is then decoded from the identified positions and types of the elements of the payload data pattern based on the assumed two-dimensional transformation in step 623. In step 624 the (output) information in the two-dimensional barcode is compiled from the first information and the second information.

According to further embodiments, the method is performed along one of the following alternatives. First, the two-dimensional transformation is assumed in step 622 based on the orientation pattern, i.e. the characteristics of the orientation pattern are analyzed for determining a transformation that was applied to the two-dimensional barcode (e.g. arrangement of solid-line and clock-line segments are compared to a normal, non-transformed (identity) arrangement sequence along the circumference of a datamatrix orientation pattern). Further, a result from decoding the first information is evaluated in optional step 625' so as to be successful or non-successful (failed). Accordingly, the two-dimensional transformation can be assumed to be different in step 625" and the step 623 of decoding the first information is repeated based on the assumed different (other) two-dimensional transformation.

FIG. 8 shows a schematic view of a device for encoding a two-dimensional barcodes according to a device embodiment of the present invention. The device 70 comprises processing resources, such as a processing unit 701, a memory unit 702, and a communication unit 703. The memory unit 702 stores code so as to instruct the processing unit 701 to perform one of the applicable method embodiments. Specifically, the memory unit 702 stores code to configure the resources to obtain information to be encoded in the two-dimensional barcode, extract, from the obtained information, first and second information, wherein the first information is to be encoded in the payload data pattern of the two-dimensional barcode, generate the payload data pattern based on the first information, and to compile a two-dimensional barcode pattern from the generated payload data pattern and an orientation pattern, wherein a two-dimensional transformation is considered based on the second information, the two-dimensional transformation applying at least to the payload data pattern.

The device 70 communicates by means of communication unit 703 with network 90 so as to receive operation instructions and/or the information to be encoded in a two-dimensional barcode. Optionally, device 70 may comprise means 704 for attaching a generated two-dimensional barcode pattern onto an item. Means 704 may involve any suitable parts, including printers, print heads, inkjet print heads, laser emitters, embossing/milling tools, and the like.

Figure 9A:
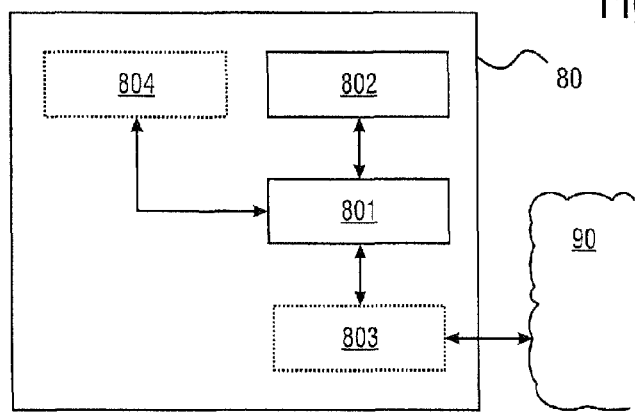
FIGS. 9A to 9C show schematic views of devices for decoding (and optionally reading) a two-dimensional barcodes according to further device embodiments of the present invention.

FIG. 9A shows a general device embodiment of the present invention. Specifically, there is a schematic representation of decoding device 80 comprising a processing unit 801 and a memory unit 802. The memory unit 802 may store code that, when executed on the processing unit 801, implements one or more method embodiments of the present invention. Optionally, the device 80 may comprise an acquisition unit 804 for acquiring a digital image data of a barcode attached to an item that is subject to decoding. The acquisition unit 804 can be in form of a CCD (charged coupled device) sensor/camera. Additional elements, such as optical filters, lenses, light sources, and the like, can be included in the acquisition unit 804. Furthermore, device 80 may comprise a communication unit 803 for communicating a decoding and/or authentication result, acquired data or command data to or from other entities, such as servers, controllers and the like. The communication may be effected over a network 90, such as a local area network (LAN), wireless network (WLAN), the Internet, a short-range wireless link and the like. Further, also bus systems, such as CAN, can be employed for data exchange.

Figure 9B:
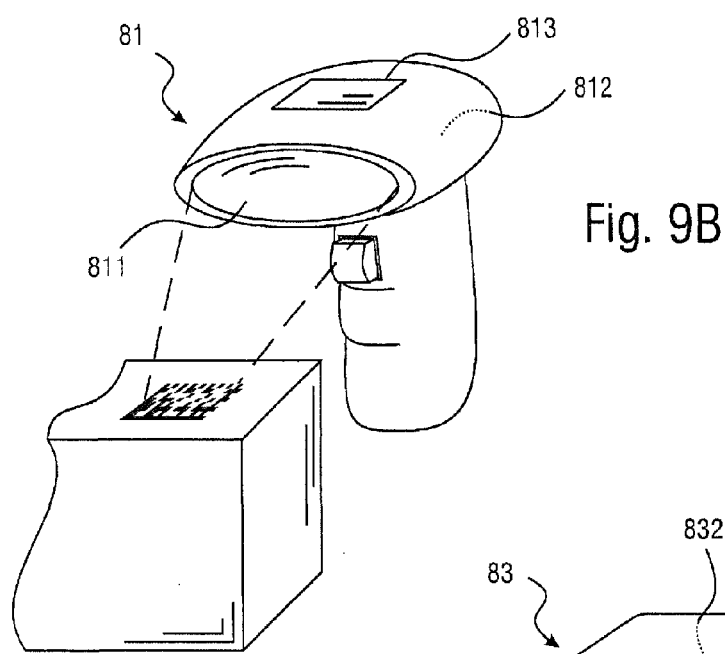

FIG. 9B shows a schematic view of a handheld embodiment of a device for reading/decoding a barcode. The device 81 comprises a window 811 through which a digital image of the barcode on an item that is subject to inspection can be acquired. As shown, a barcode is applied to an item and placed in the field of view of device 81. The device 81 further comprises integrated processing equipment 812, usually including a processing unit, a memory unit, and possibly also a communication unit. Besides one or more (optional) operation buttons, device 81 may also comprise notifying means 813 (display, light indicators, and the like) for communicating a decoding and/or authentication result to a user. In case of a display being a touch-sensitive display, it can be dispensed with any further operation buttons/elements, since device operation can be fully facilitated by means of a touch screen. The device 81 may also comprise an optional light source for illuminating a an item during inspection. Yet further, additional means may be provided for acoustically notifying an authentication result to a user.

Figure 9C:
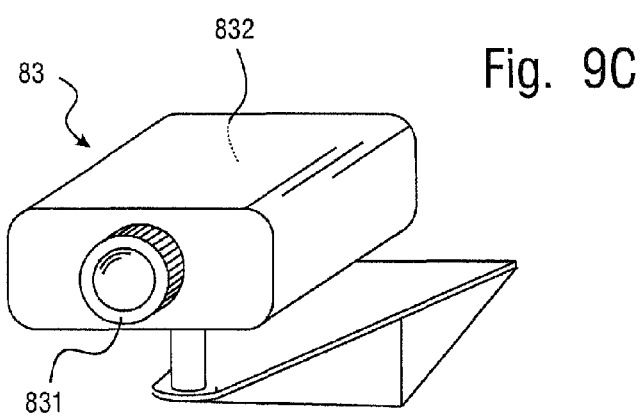

FIG. 9C shows a schematic view of a fixed-type embodiment of a device for reading/decoding. Like, for example, a module operable to be mounted on a production/distribution line for reading barcodes disposed on items transported on said line. The device 83 comprises a window 831 through which an image of a barcode, usually as attached to an item, can be acquired. The device 83 further comprises integrated processing equipment 832, usually including a processing unit, a memory unit, and possibly also a communication unit. Besides one or more (optional) operation buttons, device 83 may also comprise an optional light source for illuminating an item during the acquisition of the image. An additional fixation element may be provided for mounting the device 83 at, for example, a production line in which a plurality of items pass by the device for inspection and/or authentication. The device may, of course, take other forms and may be wire-bound or wireless.

In the embodiments described in conjunction with any one of FIGS. 9A, 9B, and 9C, the processing resources (or processing and memory units) are configured to implement one or more method embodiments of the present invention, and, more specifically, to implement a method of decoding information in a two-dimensional barcode, involving identifying the type of the elements and the positions of the elements from image data of the two-dimensional barcode, assuming a two-dimensional transformation having applied to at least the payload data pattern and setting accordingly second information, decoding first information from the identified positions and types of the elements of the payload data pattern based on the assumed two-dimensional transformation, and compiling the information in the two-dimensional barcode from the first information and the second information. The compiled information or a (authentication) result from the compiled information is communicated and/or displayed.

Although detailed embodiments have been described, these only serve to provide a better understanding of the invention defined by the independent claims, and are not to be seen as limiting.

The invention claimed is:

1. A method of encoding information in a two-dimensional barcode, the barcode comprising an orientation pattern and a payload data pattern both being compiled of first and second type elements, the method comprising:

obtaining information to be encoded in the two-dimensional barcode;

extracting, from the obtained information, first and second information, wherein the first information is to be encoded in the payload data pattern of the two-dimensional barcode;

generating the payload data pattern based on the first information;

compiling a two-dimensional barcode pattern from the generated payload data pattern and an orientation pattern, wherein a two-dimensional transformation is reviewed based on the second information, the two-dimensional transformation being applied at least to the payload data pattern.

2. The method of claim 1, wherein the two-dimensional transformation is reviewed by applying the two-dimensional transformation to the compiled two-dimensional barcode pattern based on the second information.

3. The method of claim 1, wherein the two-dimensional transformation is reviewed by applying the two-dimensional transformation to the payload data pattern based on the second information.

4. The method of claim 1, wherein the two-dimensional transformation is reviewed, based on the second information, during the generating of the payload data pattern based on the first information.

5. The method of claim 1, wherein the reviewed two-dimensional transformation comprises applying a mask for assigning positions of the elements of the payload data pattern to positions in a bit sequence.

6. The method of claim 1, wherein the method further comprises generating an additional element in the vicinity of the two-dimensional barcode pattern, wherein any one of an orientation of the two-dimensional barcode pattern relative to the additional element, a position of the two-dimensional barcode pattern relative to the additional element, and a transformation of at least parts of the two-dimensional barcode pattern relative to the additional element is based on the second information.

7. The method of claim 1, wherein the method further comprises incorporating a verification mechanism into the payload data pattern.

8. The method of claim 7, wherein the verification mechanism is incorporated by calculating one or more of a checksum, an error correction code, and a Reed-Solomon polynomial.

9. The method of claim 1, wherein the transformation includes one or more of a rotation transformation, a rotation transformation by 90 degrees, a rotation transformation by n×90 degrees, n=1, 2 or 3, a reflection transformation, a point reflection transformation, a reflection transformation across a line, and an identity transformation.

10. The method of claim 1, wherein the first information is represented by a first sequence of bits, and the second information is represented by one more bits preceding or succeeding the first sequence of bits.

11. The method of claim 1, wherein the two-dimensional barcode is any one of a symmetric datamatrix barcode, an asymmetric datamatrix barcode, and a QR-code.

12. A computer program comprising code executable by a processing unit, the code when executed implementing a method of claim 1.

13. A computer program product comprising a non-transitory tangible medium storing the code of the computer program of claim 12.

14. A method of decoding information in a two-dimensional barcode, the barcode comprising an orientation pattern and a payload data pattern both being compiled of first and second type elements, the method comprising:

identifying the type of the elements and the positions of the elements from image data of the two-dimensional barcode;

setting second information based on a first two-dimensional transformation having been applied to at least the payload data pattern;

decoding first information from the identified positions and types of the elements of the payload data pattern based on the first two-dimensional transformation; and compiling the information in the two-dimensional barcode from the first information and the second information.

15. The method of claim 14, wherein the first two-dimensional transformation is based on the orientation pattern.

16. The method of claim 14, wherein the first two-dimensional transformation is based on a result from decoding the first information.

17. The method of claim 16, wherein, in an event of the decoding first information failing, the method further comprises repeating the decoding of the first information based on a second two-dimensional transformation having been applied to at least the payload data pattern.

18. The method of claim 14, wherein the method further comprises evaluating a verification mechanism on the first information for determining whether decoding the first information was successful or failed.

19. The method of claim 18, wherein the verification mechanism includes calculating one or more of a checksum, an error correction code, and a Reed-Solomon polynomial.

20. The method of claim 14, wherein the decoding of the first information comprises applying a mask for assigning positions of the elements of the payload data pattern to positions in a bit sequence.

21. The method of claim 14, wherein the method further comprises identifying an additional element in the vicinity of the two-dimensional barcode, wherein the first two-dimensional transformation and/or setting the second information is based on any one of an orientation of the two-dimensional barcode relative to the additional element, a position of the two-dimensional barcode relative to the additional element, and a transformation of at least parts of the two-dimensional barcode relative to the additional element.

22. A device for encoding information in a two-dimensional barcode, the barcode comprising an orientation pattern and a payload data pattern both being compiled of first and second type elements, the device comprising processing resources being configured to:

obtain information to be encoded in the two-dimensional barcode;

extract, from the obtained information, first and second information, wherein the first information is to be encoded in the payload data pattern of the two-dimensional barcode;

generate the payload data pattern based on the first information;

compile a two-dimensional barcode pattern from the generated payload data pattern and an orientation pattern, wherein a two-dimensional transformation is reviewed based on the second information, the two-dimensional transformation being applied at least to the payload data pattern.

23. The device of claim 22, wherein the processing resources are configured to implement a method of encoding information in a two-dimensional barcode, the barcode comprising an orientation pattern and a payload data pattern both being compiled of first and second type elements.

24. The device of claim 22, wherein the compiled two-dimensional barcode pattern is attachable to an item.

25. The device of claim 22, wherein the processing resources comprise a processing unit and a memory unit, the memory unit being configured to store code executable by the processing unit.

26. A device for decoding information in a two-dimensional barcode, the barcode comprising an orientation pattern and a payload data pattern both being compiled of first and second type elements, the device comprising processing resources being configured to:
    identify the type of the elements and the positions of the elements from image data of the two-dimensional barcode;
    setting second information based on a first two-dimensional transformation having been applied to at least the payload data pattern;
    decode first information from the identified positions and types of the elements of the payload data pattern based on the first two-dimensional transformation; and to
    compile the information in the two-dimensional barcode from the first information and the second information.

27. The device of claim 26, wherein the processing resources are configured to implement a method of decoding information in a two-dimensional barcode, the barcode comprising an orientation pattern and a payload data pattern both being compiled of first and second type elements.

28. The device of claim 26, wherein the image data of the two-dimensional barcode is acquired.

29. The device of claim 26, further being arranged as a hand-held device, wherein the compiled information or a result from the compiled information is communicated to a user.

30. The device of claim 26, further being arranged as a fixed device and including a communication unit to communicate the compiled information or a result from the compiled information.

* * * * *